(12) United States Patent
Lamblin et al.

(10) Patent No.: US 9,984,698 B2
(45) Date of Patent: May 29, 2018

(54) OPTIMIZED PARTIAL MIXING OF AUDIO STREAMS ENCODED BY SUB-BAND ENCODING

(71) Applicant: ORANGE, Paris (FR)

(72) Inventors: Claude Lamblin, Tregastel (FR); Balazs Kovesi, Lannion (FR); Arnault Nagle, Lannion (FR)

(73) Assignee: Orange, Paris (FR)

( * ) Notice: Subject to any disclaimer, the term of this patent is extended or adjusted under 35 U.S.C. 154(b) by 8 days.

(21) Appl. No.: 14/772,715

(22) PCT Filed: Mar. 24, 2014

(86) PCT No.: PCT/FR2014/050683
§ 371 (c)(1),
(2) Date: Sep. 3, 2015

(87) PCT Pub. No.: WO2014/154988
PCT Pub. Date: Oct. 2, 2014

(65) Prior Publication Data
US 2016/0019902 A1    Jan. 21, 2016

(30) Foreign Application Priority Data

Mar. 25, 2013 (FR) ..................................... 13 52672

(51) Int. Cl.
*G10L 21/02* (2013.01)
*G10L 19/16* (2013.01)
(Continued)

(52) U.S. Cl.
CPC ........... *G10L 19/167* (2013.01); *H04M 3/568* (2013.01); *H04M 7/0072* (2013.01);
(Continued)

(58) Field of Classification Search
CPC .............................. G10L 21/02; G10L 21/038
(Continued)

(56) References Cited

U.S. PATENT DOCUMENTS

2004/0104768 A1\* 6/2004 McGrath ............... H03F 1/0277
330/51
2009/0313009 A1\* 12/2009 Kovesi .................... G10L 19/24
704/203
(Continued)

OTHER PUBLICATIONS

Hiwasaki Y. et al.: "ITU-T G.711.1:extending G.711 to higher-quality wideband speech" IEE Communications Magazine, IEEE Service Center, Piscataway,vol. 47, No. 10, Oct. 1, 2009(Oct. 1, 2009_, pp. 110-116, XP011283324, ISSN.
Shigeaki Sasaki NTT Japan, "A Simple Partial Mixing Method for Wideband Extension to G.711", ITU-T Draft; Study Period 2005-2008, International Telecommunication Union, Geneva; CH, vol. Study Group 16, Feb. 16, 2007, pp. 1-3.
(Continued)

*Primary Examiner* — Michael N Opsasnick
(74) *Attorney, Agent, or Firm* — Haverstock & Owens LLP

(57) ABSTRACT

The invention relates to a method for combining a plurality of audio streams encoded by frequency sub-band encoding, comprising the following steps: decoding (E301) a portion of the encoded streams over at least one frequency sub-band; combining (E302) the streams thus encoded to form a mixed stream; selecting (E303), from among the plurality of encoded audio streams, at least one encoded replication stream, over at least one frequency sub-band that is different from that of the decoding step. The method is such that the selection of the at least one encoded replication stream is carried out according to a criterion which takes into consideration the presence of a predetermined frequency band in the encoded stream (E304). The invention also relates to a device which implements the described method and can be integrated into a conference bridge, a communication terminal or a communication gateway.

15 Claims, 6 Drawing Sheets

(51) Int. Cl.
*H04M 3/56* (2006.01)
*H04M 7/00* (2006.01)
*G10L 19/24* (2013.01)
*H04L 29/06* (2006.01)

(52) U.S. Cl.
CPC ............ *G10L 19/173* (2013.01); *G10L 19/24* (2013.01); *H04L 65/1069* (2013.01)

(58) Field of Classification Search
USPC .................................................. 704/500–504
See application file for complete search history.

(56) References Cited

U.S. PATENT DOCUMENTS

| | | | |
|---|---|---|---|
| 2011/0173008 A1* | 7/2011 | Lecomte .................. | G10L 19/20 704/500 |
| 2012/0065753 A1* | 3/2012 | Choo ...................... | G10L 19/18 700/94 |
| 2012/0065965 A1* | 3/2012 | Choo ...................... | G10L 21/038 704/203 |
| 2012/0185255 A1* | 7/2012 | Virette .................. | G10L 19/002 704/500 |

* cited by examiner

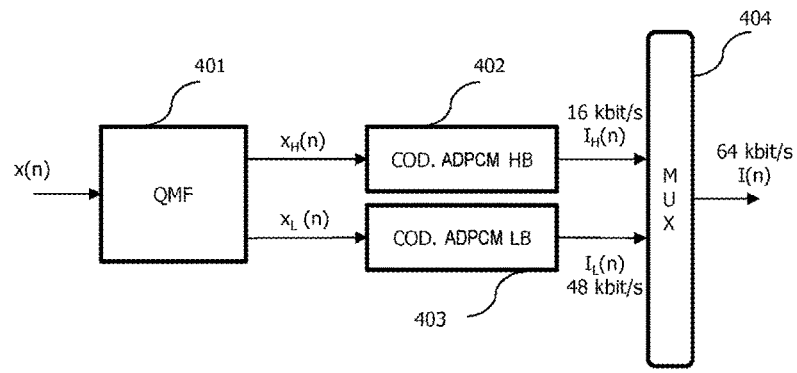
Fig.4
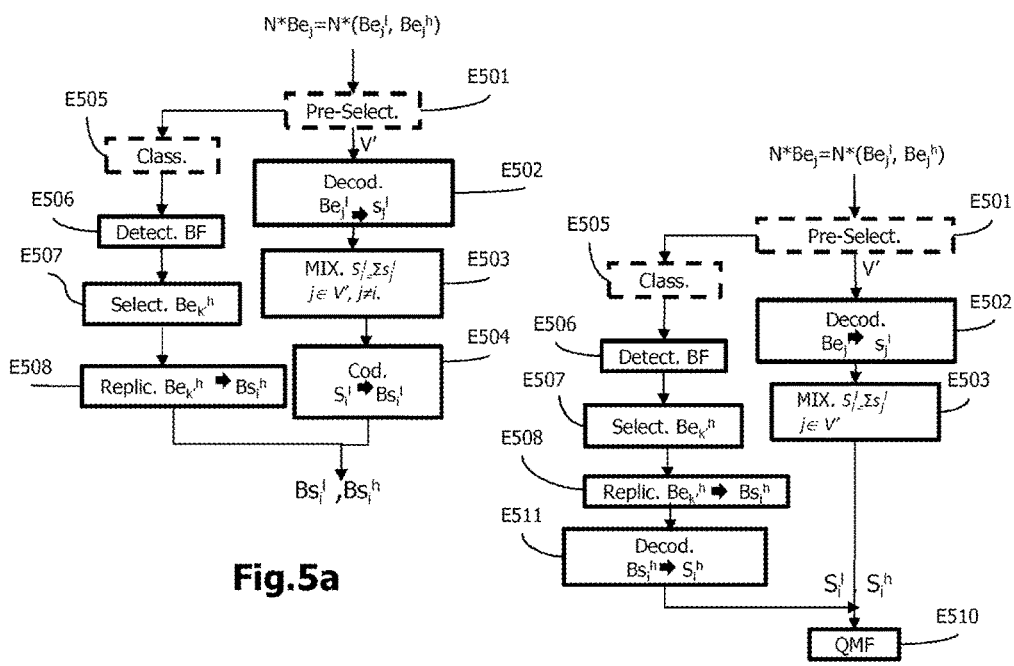
Fig.5a  Fig.5b

US 9,984,698 B2

OPTIMIZED PARTIAL MIXING OF AUDIO STREAMS ENCODED BY SUB-BAND ENCODING

The present invention pertains to the processings of a plurality of coded audio streams such as mixing, multiplexing of signals, transcoding, decoding, processings in the coded domain and other particular processings.

These processings can be performed in equipment such as mixing and/or multiplexing based conference bridges, communication terminals, communication gateways, etc.

The invention may thus be implemented in an audioconference context both on synchronous networks (ISDN, STN, etc.) and on asynchronous networks (IP, ATM, FRAME RELAY, etc.). The streams may originate from heterogeneous networks and may have undergone different processings (for example may have been coded by different audio compression systems).

The invention relates in particular to the streams obtained by sub-band coding algorithms such as the ITU-T G.711.1 and G.722 standardized coders. It is aimed in particular at the processings of audio stream mixing and/or replication type.

The most commonplace applications for such processings are multi-party communications such as audioconferencing or videoconferencing.

Two communication configurations are generally considered: one using a meshed architecture with point-to-point linked terminals, another using a centralized architecture with a Multipoint Control Unit (MCU).

In the case of a centralized architecture, the control unit comprises a bridge—central point which either "adds together" the audio streams (principle of mixing) or duplicates the audio streams (principle of replication). Two large categories of bridge therefore exist: the mixing based bridge and the replicating bridge.

The operating principle of the replicating bridge is illustrated in FIG. 1a. Each sender terminal ($T_0, \ldots, T_j, \ldots, T_{N-1}$) dispatches to the bridge P its audio stream $Be_j$, obtained by coding (COD.) of its input signal $Se_j$, be it of mono, stereo, multichannel etc. type.

The bridge transmits the streams of the sender terminals to each receiver terminal ($T_i$). On the basis of the N input signals received, for each output i, the bridge transmits the (N−1) streams ($Be_0, \ldots, Be_{i-1}, Be_{i+1}, \ldots, Be_{N-1}$) received from the inputs ($E_j$) ($0 \le j < N$, $j \ne i$) to the terminal i. In FIG. 1a, the terminal $T_i$ receives N−1 streams from the bridge corresponding to the N−1 other terminals ($T_0, \ldots, T_{i-1}, T_{i+1}, \ldots, T_{N-1}$).

The bridge therefore merely duplicates the streams and multiplexes them (MUX) so as to transmit them to the respective terminals via its output module $S_i$. Thus the advantages of this type of bridge are that it does not need significant software resources and can therefore support numerous conferences, and that it does not need to perform operations for coding and decoding the audio streams, thereby avoiding the loss of audio quality and the generation of an additional delay.

The terminals which receive the duplicated streams can if necessary manage the spatialization of these streams independently.

On the other hand, the software resources and the calculational capabilities of the terminals must be greater so as to process the streams received by demultiplexing them (DEMUX), by decoding them (DECOD.) and by mixing them (MIX.) and if necessary by spatializing them to obtain the mixed signal $S_{Mi}$. Thus, the number of participants in a conference may be limited by the capabilities of the terminals.

According to the number of audio streams to be transmitted to a terminal in the downgoing stream, the corresponding passband may be large. The terminals must have the same type of coders/decoders to manage the streams, and therefore potentially possess a large set of coders/decoders.

The operating principle of a mixing bridge is illustrated in FIG. 1b and is now described.

Each sender terminal ($T_0, \ldots, T_j, \ldots, T_{N-1}$) dispatches to the bridge P its audio stream $Be_j$, obtained by coding (COD.) of its input signal $Se_j$, be it of mono, stereo, multichannel, etc. type.

The bridge performs the mixing (MIX.) of the streams and then the routing to the terminals concerned. On the basis of the N input signals received, the bridge prepares the N output signals to be transmitted by summation. Thus the sum of the (N−1) signals of the inputs ($E_j$) ($0 \le j < N$, $j \ne i$) is directed toward the output $S_i$ ($0 \le i < N$). Accordingly, the audio bridge firstly performs the decoding (DECOD.) of the incoming bitstreams, and then for each output i, the (N−1) decoded signals of the inputs ($E_j$) ($0 \le j < N$, $j \ne i$) are added together and this mixed signal is re-encoded (COD.) before being transmitted to the terminal i. Subsequently, we call the re-encoded signal the mixed stream.

In FIG. 1b, the terminal i receives the mixed stream $Bs_i$ by the bridge P on the basis of the N−1 streams ($Be_0, \ldots, Be_{i-1}, Be_{i+1}, \ldots, Be_{N-1}$) received and decoded from the other terminals ($T_0, \ldots, T_{i-1}, T_{i+1}, \ldots, T_{N-1}$). The terminal i obtains the decoded mixed signal $S_{Mi}$ by decoding (DECOD.) the stream $Bs_i$.

In contradistinction to the principle of the replicating bridge, this principle concentrates the software capabilities and resources on the mixing bridge rather than in the receiver terminals. The intelligent central entity makes it possible to manage a large number of participants. The spatialization block can be integrated into the bridge so as to manage a common sound scene shared between all the participants. The passband necessary for the transmission of the mixed stream to the terminals need not be large even with a large number of participants. The terminals need not have the same type of codec as long as the bridge possesses the necessary codecs.

On the other hand, the processings and the necessary resources are as therefore greater on the bridge. It is more difficult to independently manage a spatialization in the terminals and the audio quality is worse on account of the decoding and coding operations performed on the bridge.

In a meshed teleconference architecture the various terminals are in point-to-point communication. In the conventional case, the (N−1) audio streams arriving at a terminal are decoded completely before being mixed in the time domain. The advantages and drawbacks for the terminals of a replicating bridge are encountered again.

To reduce the complexity of the mixing of streams coded by transform based or sub-band coders, various schemes have been proposed.

A technique used to decrease complexity consists in restricting the number of streams retransmitted at the level of the multipoint and therefore in performing the mixing only on part of the signals received. Such a technique is for example described in the document entitled "Tandem-free VoIP conferencing: a bridge to next-generation networks" by the authors Smith, P. J., Kabal, P., Blostein M. L., Rabipour, R in IEEE Communications Magazine vol. 41, No 5, May 2003.

Several strategies exist for selecting the coded streams which are taken into account: for example, only the streams with a higher intensity (LT "Loudest Talker" criterion) are considered. Another criterion, time based rather than energy based, termed FCFS (for "First Come First Served") uses a ranking of the pathways according to the order in which the participants take their turn to speak; this criterion relies on voice activity detection. For example, in the case of transmission of the audio streams in packets according to the RTP protocol with extension of the header such as described in RFC 6464 (J. Lennox, E. Ivov, E. Marocco, "A Real-time Transport Protocol (RTP) Header Extension for Client-to-Mixer Audio Level Indication", RFC 6464, December 2011), the header comprises an indication of the level of the audio stream and optionally a voice activity indicator, thereby facilitating this selection of the stream in an item of mixing equipment (such as a bridge).

According to the systems, the number of streams selected may be fixed or variable. In general, it is considered that the selection of two to three streams allows a good compromise between reduction in complexity and maintenance of a good level of participation. The FCFS criterion uses the VAD ("Voice Activity Detector") decisions while the LT criterion requires a measurement of the power of the signal or of its energy.

The reduction in the number of inputs is also used in the replicating bridge to decrease the downgoing bitrate toward the remote terminals and to decrease the complexity of the processing in these terminals.

Within the framework of the hierarchical extensions of the ITU-T G.711 coder/decoder, another mixing technique—partial mixing—has been proposed. This technique is described in the document entitled "ITU-T G.711.1: Extending G.711 to Higher-Quality Wideband Speech" by the authors Hiwasaki Yusuke, Ohmuro Hitoshi, in IEEE Communications Magazine vol. 47, No 10, October 2009.

This technique exploits the sub-band hierarchical structure: rather than decoding the bitstreams entirely, only the core layers (G.711 compatible) are decoded and mixed, before being re-encoded, the enhancement layers (low and high) are not decoded. Instead of this, a single stream is selected from among all the incoming streams and only the enhancement layers of this selected stream are retransmitted to the other remote terminals with the mixed and re-encoded core layers. The terminal whose enhancement layers are replicated receives only the mixed core layers of the other terminals. Partial mixing is therefore a hybrid approach between replication with selection of a single stream and mixing, with mixing by direct recombination of the decoded signals of the low sub-band corresponding to the core layer. FIG. 2 illustrates the operation of partial mixing applied to G.711.1.

It may indeed be seen that the terminals A, B and C each dispatch an audio stream comprising a core layer (Core) and at least one enhancement layer (Enh) to a bridge (MCU) P. This bridge comprises a first module 203 which performs a mixing of the core layers. Thus, for the terminal A, the mixing is performed by addition of the decoded core layers of the streams originating from B and from C (core[B]+core[C]), for the terminal B, the mixing is performed by addition of the decoded core layers of the streams of A and of C (core[A]+core[C]) and for the terminal C, the mixing is performed by adding together the decoded core layers of the streams of A and of B (core[A]+core[B]).

The selection module 201 of the MCU selects a so-called replication stream from among the incoming streams according to one of the criteria defined hereinabove. In this figure, the stream originating from A is the one chosen. The enhancement layer or layers of this stream (Enh[A]) is or are replicated (by the replication module 202) and transmitted to the terminals other than the terminal A, as a supplement to the coded mixed stream.

The application of partial mixing to the hierarchical extensions makes it possible to noticeably reduce the complexity of the combining of the streams. Indeed though the decoding of the signals of the core layers and the re-encoding of their sums by the G.711 codec is not very complex, the coding and the re-encoding of the enhancement layers is more so.

This partial mixing scheme therefore makes it possible to considerably reduce complexity while guaranteeing continuity of the mixing at the level of the core layer since only the enhancement layers of a stream are switched.

Although the partial mixing technique has been described in the case of sub-band hierarchical coders with a G.711 core coding (NTT UEMCLIP proprietary coder, ITU-T G.711.1 coder) while replicating a part of the bitstream of only a single input pathway, it is understood that the combination of mixing for a part of the bitstream and of replication for another part of the bitstream of only a single input pathway may be applied to other coders such as the ITU-T G.722, G.729.1 coder or the OPUS coder described in RFC 6716 from the IETF (Valin, J M., Vos, K., and T. Terriberry, "Definition of the Opus Audio Codec", RFC 6716, September 2012).

Likewise, when the bitrate so allows, it is possible not to limit the replication to a single input pathway but to replicate a part of the bitstream of more than one input pathway.

The selection of the stream whose enhancement layers are replicated remains one of the problems to be solved in partial mixing.

In a conventional manner, the selection of the stream to be replicated is performed either by voice activity detection to determine whether or not the stream is active, or by determination of the energy of the stream by selecting the most energetic stream.

However, the selection of the stream to be replicated according to an energy-related and/or voice activity criterion may give rise to switchings of the audio passband that are unpleasant to the ear. Indeed, on account of the heterogeneity of the communications, some streams although coded by HD (high definition) coders may not comprise any HD contents.

HD codecs are indeed capable of effectively compressing voice over a wide band of frequencies. They make it possible to transmit voice in "High Definition" (HD) quality encoded on a frequency span ranging from 50 Hz to 7 kHz (wideband).

HD voice is aimed at providing quality and comfort of listening that are hitherto unknown on conventional telephone networks. Its advantages for users are on the one hand functional; widening of the frequency band increases intelligibility, listening comfort favors long conversations; but also of an emotional kind. The rendition of the major part of the speech spectrum does indeed ensure faithfulness of voice and a genuine sensation of presence. Eventually, "super-HD" (superwideband SWB) voice up to 15 kHz or indeed "Hifi" (or fullband FB) over the entire band of audible frequencies [20 Hz-20 kHz] is envisaged.

HD Voice requires an end-to-end compatible communication chain, that is to say from the microphone to the earphone of the remote terminal. It relies on coding formats which guarantee wide-band quality and which, being standardized, ensure interoperability between the various elements of the chain. In the telecommunications industry, three formats are employed: the ITU-T G.722 coder described for example in the document "Rec. ITU-T G.722, 7 kHz audio-coding within 64 kbit/s, November 1988", the ITU-T G.711.1 coder described for example in the document "Rec. ITU-T G.711.1, Wideband embedded extension for G.711 pulse code modulation, 2008", for wide-band communications on fixed networks and the 3GPP AMR-WB coder described for example in the document "3GPP TS 26.190 V10.0.0 (2011-03) 3rd Generation Partnership Project; Technical Specification Group Services and System Aspects; Speech codec speech processing functions; Adaptive Multi-Rate-Wideband (AMR-WB) speech codec; Transcoding functions (Release 10)" for those on mobile networks. Schematically, bringing HD Voice to the market calls upon two components. Firstly, one requires a telecommunication network compatible with wide-band coders—stated otherwise which is transparent to these coding formats—and with guaranteed Quality of Service. Also, one requires terminals in which the wide-band coder is embedded, which inter-operate with the network and whose acoustic characteristics safeguard HD Voice quality.

The dynamism of the multimedia communication sector and the heterogeneity of networks, access ports and terminals have engendered a proliferation of compression formats. Numerous schemes exist for compressing media signals so as to reduce bitrate while maintaining good quality.

The presence of various compression formats in the communication chains requires several codings in cascade (transcoding). Transcoding is necessary when, in a transmission chain, a compressed signal frame sent by a coder can no longer continue on its path in this format. Transcoding makes it possible to convert this frame into another format compatible with the remainder of the transmission chain. The most elementary solution (and the most commonplace at the present time) is the end-to-end placement of a decoder and of a coder. The compressed frame arrives in a first format and is decompressed. This decompressed signal is then compressed again in a second format accepted by the remainder of the communication chain. This cascading of a decoder and of a coder is called a tandem. It should be noted that during a tandem, coders coding different frequency ranges may be cascaded. Thus, a wide-band coder may be led to code an audio content of more restricted band than the wide-band. For example, the content to be coded by the fixed HD coders (G.722 and G.711.1) although sampled at 16 kHz may only be in the telephone band since it was coded previously by a narrowband coder (like the ITU-T G.711 standard). It may also happen that the limited quality of the acoustics of the sender terminal does not make it possible to cover the whole of the wide-band.

It is therefore seen that the audio band of a stream coded by a coder operating on signals sampled at a given sampling frequency may be much more restricted than that supported by the coder. Now, in many applications, the knowledge of the audio band of a content to be processed—in particular the taking into account of the presence of a predetermined frequency band in the coded stream (the presence of a frequency band indicating that there is a relevant content)—is useful.

Thus in the case of a multi-party communication, partial mixing such as described previously, based on the energy criterion alone, might lead to the enhancement band of a content which is actually HD being switched to that of a narrowband content NB and vice versa. For example, if the content of terminal A represented in FIG. 2 is not HD and that of terminal B is, then terminal C receives a stream with changes of audio band that are very perceptible and detrimental to listening comfort and to intelligibility in the voice of B, upon changes of "replicated" terminal (a terminal, a part of whose layers is replicated). Likewise when a terminal ceases to be replicated, it may then receive a stream with HD content whereas, before, it received only a mixed signal, therefore limited to the low sub-band.

A need therefore exists to enhance listening comfort upon a change of replicated stream within the framework of partial mixing.

The present invention improves the situation.

It proposes, for this purpose, a method for combining a plurality of audio streams coded according to a frequency sub-band coding, comprising the following steps:
  decoding of a part of the streams coded on at least one frequency sub-band;
  addition of the streams thus decoded to form a mixed stream;
  selection from among the plurality of coded audio streams, of at least one replication coded stream, on at least one frequency sub-band different from that of the decoding step.

The method is such that the selection of the at least one replication coded stream is effected according to a criterion taking into account the presence of a predetermined frequency band in the coded stream.

Thus, the replication stream associated with a mixed stream is selected in such a way that the desired frequency band is included. There is therefore no passband disparity upon switching from one replicated stream to another, thereby enhancing the quality of the resulting audio stream and the listening comfort of the user receiving the audio stream resulting from the method.

The various particular embodiments mentioned hereinafter can be added, independently or in combination with one another, to the steps of the above-defined combining method.

In a particular embodiment, the method furthermore comprises a step of preselecting the coded audio streams according to a predetermined criterion.

Preselection makes it possible to decrease the number of streams to be mixed and therefore to decrease the complexity of the mixing. Moreover, the verification of the presence of the predetermined frequency band is then effected on a more restricted number of streams, thereby further decreasing the complexity of the method.

The predetermined criterion may for example be an energy criterion and/or voice activity criterion.

In one embodiment, in the case where several coded streams are selected in the selection step, an additional selection of replication coded stream is performed on a criterion of precedence of selection of the streams.

This additional selection makes it possible to reduce the number of streams to be taken into account and to avoid too much stream switching over time. Retaining as far as possible the same replicated stream makes it possible to ensure continuity and a gentle transition.

In a possible application on a central bridge (MCU) managing several terminals, the method furthermore comprises a step of re-encoding the mixed stream and a step of combining with the replication stream selected.

In a particular embodiment, the decoding step is effected on low-frequency sub-bands and the predetermined frequency band of the selection criterion is a frequency band above said low-frequency sub-bands.

This is applicable especially in sub-band coders which make it possible to obtain HD content. The presence of this HD content in the coded stream conditions its selection to constitute the audio stream to be transmitted. This is also applicable in coders such as the coder described in RFC6716 from the IETF which comprises a hybrid mode where the low frequencies (<8 kHz) are coded by a linear prediction coding technology and the high frequencies by a transform coding technology.

In a variant embodiment, the method comprises a prior step of classifying the coded audio streams and the replication coded stream selected is the first stream in this order of classification in which the predetermined frequency band has been detected.

Thus, it is not necessary to analyze all the coded streams. It suffices to select the first stream containing a predetermined frequency band.

In one embodiment of the invention, the presence of a predetermined frequency band in a coded stream is effected by a comparison of energy, in the various frequency sub-bands, of the decoded audio streams.

This is applicable in any type of sub-band coding such as G.722 or G.711.1 type coding. On the other hand, this technique requires a decoding of the streams.

For certain coding technologies, schemes for detecting the presence or absence of a frequency band (relevant content) which do not require complete decoding of the streams have been proposed. For example, for the transform based or sub-band coders such as the MPEG coders (e.g. MP3, AAC, etc.) whose coded stream comprises coded spectral coefficients, such as, for example, the MDCT coefficients in the MP3 coder, the document "Liaoyu Chang, Xiaoqing Yu, Haiying Tan, Wanggen Wan, Research and Application of Audio Feature in Compressed Domain, IET Conference on Wireless, Mobile and Sensor Networks, 2007; (CCWMSN07), Page(s): 390-393, 2007", proposes that, rather than decoding the whole of the signal, only the coefficients be decoded to determine the characteristics of the coded signal—such as the bandwidth of the coded audio content. Preferentially, the invention uses a detection scheme without complete decoding of the streams when such a scheme exists for the coding technology used. This then makes it possible to noticeably reduce the complexity of detection. Advantageously, the results of these partial decodings are saved in memory for subsequent use during the complete decoding of the audio streams to be mixed.

In another embodiment of the invention, the presence of a predetermined frequency band in a coded stream is effected according to the following steps:
  determination, by frequency sub-band of a predetermined set of sub-bands, of a signal estimated on the basis of the coded stream;
  determination, by frequency sub-band of the predetermined set of sub-bands, of non-coded parameters representative of the audio content, on the basis of the corresponding estimated signal;
  calculation of at least one local criterion on the basis of the parameters determined;
  decision as regards the presence of a predetermined frequency band in at least one sub-band of the audio content as a function of the at least one calculated local criterion.

This is applicable for example for a coding of G.722 type and makes it possible to avoid the decoding of the audio streams. Advantageously, at least one part of the determined parameters which are representative of the audio content is saved in memory for subsequent use during the decoding of the audio streams to be mixed.

The invention also applies to a device for combining a plurality of audio streams coded according to a frequency sub-band coding, comprising:
  a module for decoding a part of the streams coded on at least one frequency sub-band;
  a module for adding the streams thus decoded to form a mixed stream;
  a module for selecting, from among the plurality of coded audio streams, at least one replication coded stream, on at least one frequency sub-band different from that of the decoding step. The device is such that the selection of the at least one replication coded stream is effected according to a criterion taking into account the presence of a predetermined frequency band in the coded stream.

The device has the same advantages as those of the method that it implements.

The invention pertains to a conference bridge comprising a combining device such as described as well as to a communication terminal and a communication gateway comprising a combining device such as described.

This device exhibits the same advantages as the previously described method that it implements.

The invention is aimed at a computer program comprising code instructions for the implementation of the steps of the combining method such as described, when these instructions are executed by a processor.

Finally the invention pertains to a storage medium, readable by a processor, possibly integrated into the combining device, optionally removable, storing a computer program comprising code instructions for the execution of the steps of the combining method such as described above.

Other characteristics and advantages of the invention will be more clearly apparent on reading the following description, given solely by way of nonlimiting example and with reference to the appended drawings, in which:

FIG. 1a, described previously, illustrates the operating principle of a replicating bridge according to the prior art;

FIG. 1b, described previously, illustrates the operating principle of a mixing bridge according to the prior art;

FIG. 2, described previously, illustrates the operating principle of the partial mixing according to the prior art, applied to the coding of G.711.1 type;

FIG. 4 illustrates a coder of G.722 type delivering streams able to be combined according to the method of the invention;

FIG. 5a illustrates the steps of a particular embodiment for coded streams of G.722 type and implemented in a centralized bridge;

FIG. 5b illustrates the steps, implemented in a terminal, of the particular embodiment for coded streams of G.722 type;

Figure 1A:
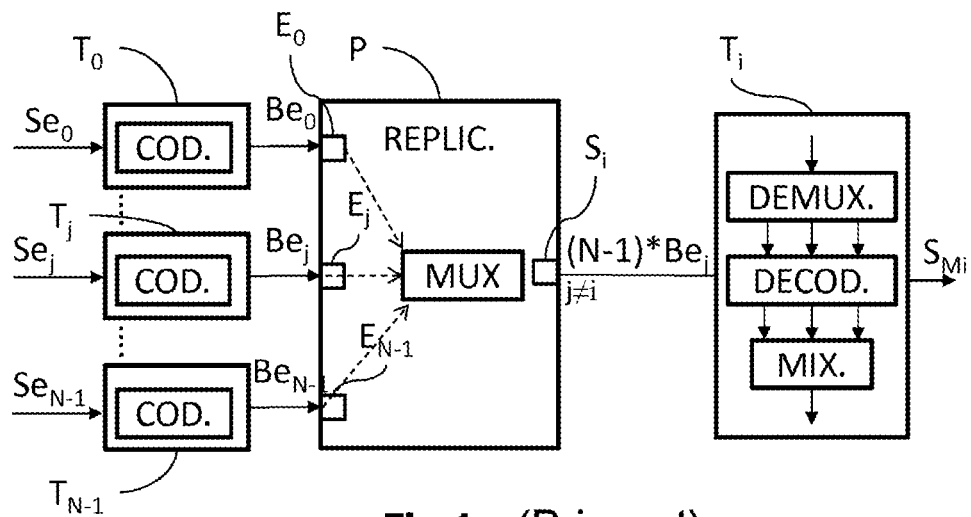
Figure 1B:
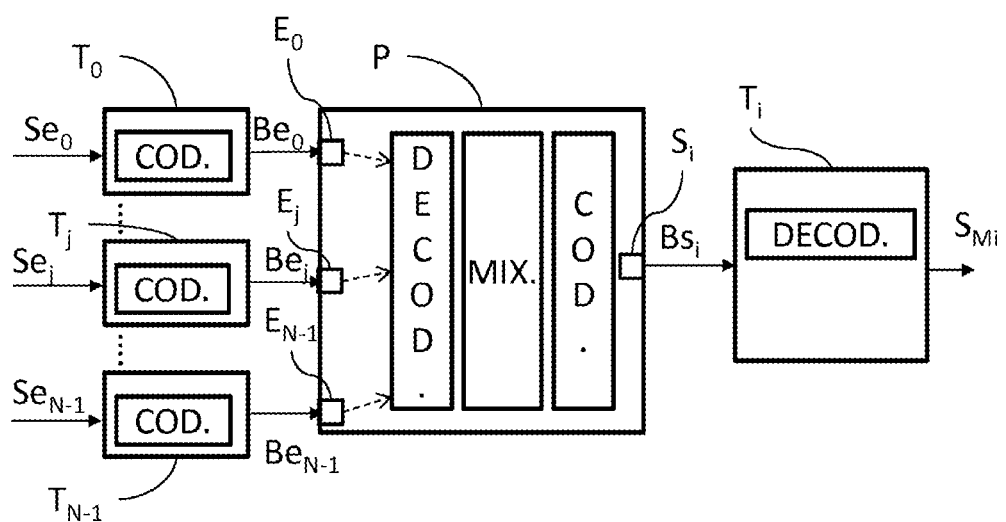
Figure 2:
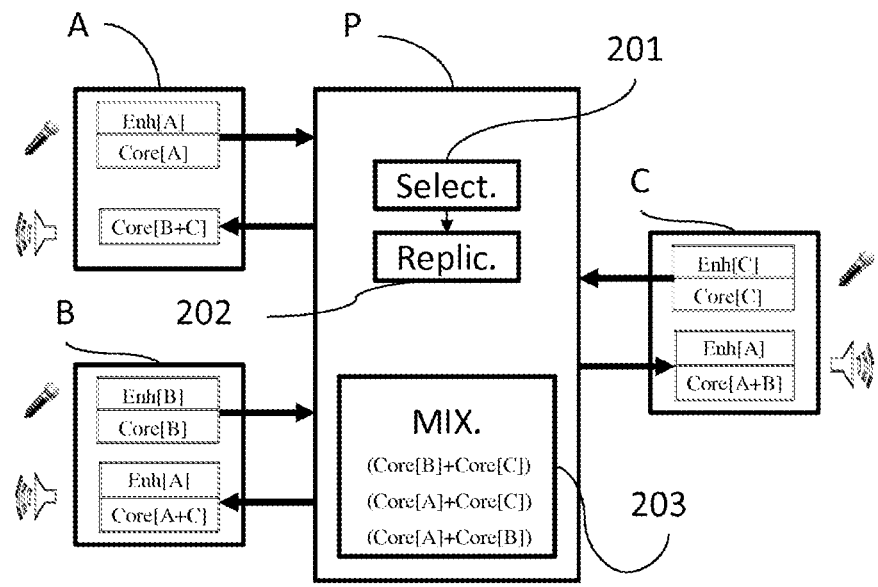
Figure 3:
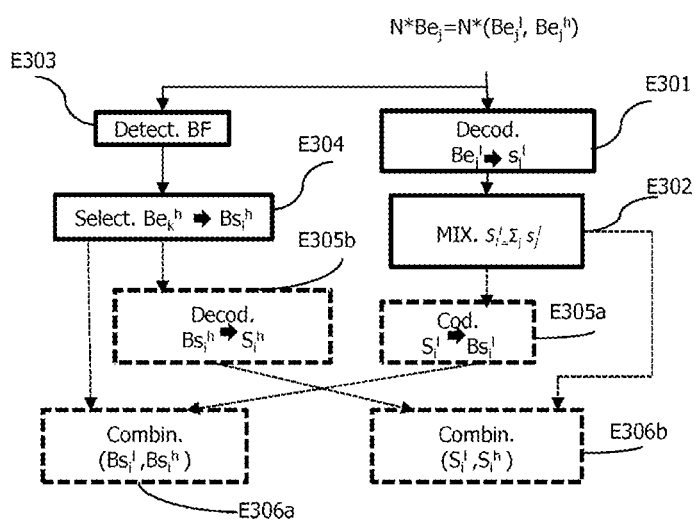
FIG. 3 illustrates the main steps of the combining method according to an embodiment of the invention.

FIG. 3 illustrates the main steps of an embodiment of the combining method according to the invention. On the basis of a plurality (N) of coded streams ($Be_j$) coded according to a frequency sub-band coding scheme, the method comprises a step of decoding at E301 a part of the coded streams received and on at least one frequency sub-band. Thus, on the basis of the bitstreams $Be_j^l$ of at least one frequency sub-band, for example the low-frequency sub-band, the reconstructed signals $s_i^l$ of the low-frequency sub-band are obtained on completion of this decoding.

In step E302, a mixing of these streams is performed on this at least one frequency sub-band. The decoded streams are therefore added together to form a mixed signal $S_i^l = \Sigma_j s_j^l$ (with $0 \leq j < N$, and in the case of the centralized bridge $j \neq i$). In an optional step E305a, the mixed signal $S_i^l$ is coded to obtain a stream $Bs_i^l$.

On the basis of the coded streams received, a step E304 of selecting at least one replication coded stream is performed. This selection is performed on at least one frequency sub-band different from that (those) used for the decoding step. To implement this selection according to the invention, a step E303 is implemented to detect the presence of a predetermined frequency band in the coded stream. For example, the presence of a content in the high-frequency band conditions the selection of the coded stream which contains it. The selected stream $Be_k^h$ then constitutes a replication stream $Bs_i^h$ to be combined in the optional step of combining E306a the bitstreams with the coded mixed stream $Bs_i^l$ obtained in step E305a: $(Bs_i^l, Bs_i^h)$. As a variant or supplement, the replication stream $Bs_i^h$ is decoded in the optional step E305b to obtain a decoded signal $S_i^h$ to be combined in the optional step of combining E306b with the mixed signal $S_i^l$ (obtained in step E302): $(S_i^l, S_i^h)$.

For the sake of conciseness, the case where the predetermined frequency band to be detected in a coded stream is a high-frequency band is described subsequently. It is obvious to the person skilled in the art to adapt this detection to other types of frequency band, for example to a low-frequency band or else to a frequency band of a predefined span of values.

Thus, a first embodiment is now described for audio streams which have been coded according to a coding scheme of standardized ITU-T G.722 type.

FIG. 4 illustrates this mode of coding. It is also described in the document cited previously: "Rec. ITU-T G.722, 7 kHz audio-coding within 64 kbit/s, November 1988".

The G.722 coder codes the input signal ($x(n)$) sampled at 16 kHz as two sub-bands sampled at 8 kHz. The division into sub-bands is done by a quadrature mirror filter (QMF) by the module 401. On the basis of two input samples the QMF filter gives as output a low band (0-4000 Hz) sample $x_L(n)$ and a high band (4000-8000 Hz) sample $x_H(n)$. The signals of the 2 sub-bands are coded independently by ADPCM (Adaptive Differential Pulse-Code Modulation) coders 402 and 403.

The indices of the two quantized prediction errors $I_H(n)$ and $I_L(n)$ are thus transmitted in the bitstream $I(n)$ after multiplexing at 404. The G.722 coder has three bitrates: 64, 56 and 48 kbit/s. Each sample of the low sub-band is coded on 6 bits at the highest bitrate (48 kbit/s), on 5 bits at the intermediate bitrate (40 kbit/s), and on 4 bits at the lowest bitrate (32 kbit/s). At the highest bitrate, the coded stream of the low sub-band consists of the core layer with 4 bits per sample and of two enhancement layers with 1 bit per sample each. The high sub-band is always coded on 2 bits (16 kbit/s) per sample independently of the bitrate.

A first exemplary embodiment is now illustrated in FIG. 5a which represents the steps of the method according to the invention, implemented in a partial mixing device with centralized architecture receiving streams coded by the 64 kbit/s ITU-T G.722 coder. As mentioned previously, this coder is a sub-band coder, the signals of the two (M=2) sub-bands being coded by ADPCM technology.

On the basis of N hierarchical bitstreams (also called input pathways hereinafter), coded in this embodiment by G.722 at 64 kbit/s, an optional step E501 of preselecting N' streams is implemented.

This preselection step makes it possible to select, from among the various input pathways, those which comply with one or more of the selection criteria described previously for the prior art schemes. For example, on the basis of the voice activity detection, the FCFS ("First Come First Served") criterion is used to select the streams. Or else, on the basis of the measurement of the power of the signal or of its energy, the LT ("Loudest Talker") criterion is used to select the streams with the highest intensity.

Thus, a part of the coded streams received by the combining device or mixing bridge is taken into account to implement the combining method. This therefore reduces the complexity of implementation of the steps of the method since the number of pathways to be combined is restricted. This preselection step is optional and the decoding step E502 can then apply to the set N of coded input audio streams.

Subsequently, for the sake of clarity, we will use the notation N' (with N'≤N) whether or not this optional step is implemented and we will denote by V' the set of indices of these pathways.

Step E502 of decoding the N' streams in the low sub-band is thereafter implemented. As a variant, which is particularly advantageous if step E502 is not very complex, the preselection step E501 can be performed after this step E502 of decoding all the low sub-band input streams.

Or else, as a supplement, a second preselection step can be performed after this decoding step so as optionally to further restrict the number of pathways to take into account thereof in the selection of a high sub-band stream to be replicated (steps E505 to E507) and/or of low band sub-band mixing (step E503).

For these N' coded audio streams, for each pathway j ($j \in V'$) we denote by:

$Be_j^l$ the incoming low sub-band bitstream (composed of the core layer and of two enhancement layers);

$Be_j^h$ the incoming high sub-band bitstream.

In the decoding step E502, the reconstructed signal $s_j^l$ of the low sub-band is obtained by decoding the stream $Be_j^l$.

In step E503, a procedure for mixing the bitstreams thus decoded is performed by addition of signals thus reconstructed of the low sub-band: $S_i^l = \Sigma s_j^l$ with $j \in V'$, $j \neq i$. Note that if $i \in V'$, $S_i^l$ is the sum of N'−1 signals, otherwise $S_i^l$ is the sum of N' signals.

The low sub-band output bitstream ($Bs_i^l$) intended to be transmitted to a terminal Ti ($0 \leq i < N$) is then obtained by coding in step E504, by the low sub-band encoder of G.722 (ADPCM on 6 bits), of this sum signal $S_i^l$.

On the basis of the set N' of input pathways, a step of detecting a predetermined frequency band E506 is performed. In this embodiment, the predetermined frequency band is the high-frequency band. This makes it possible to determine the presence of an HD content in the coded stream. Thus, an analysis of the audio content of the input pathways is performed.

Various modes of detection of the presence of the high-frequency band are possible. For example, the scheme for detecting an HD content in a stream j can use a comparison of the energy of the reconstructed signal of the high sub-band, $s_j^h$, with that of the reconstructed signal of the low sub-band $s_j^l$. This embodiment requires a decoding of the audio stream to be analyzed in the high sub-band, in addition to the decoding of the low sub-band.

As an alternative, to avoid the decoding of the signals of the high sub-band, a low algorithmic cost detection method can be implemented. This method is described subsequently with reference to FIG. 9.

In step E507, a selection of at least one coded stream k' having HD content is performed. In the case where several coded streams comprise HD content, an additional selection, not represented in FIG. 5a, can be implemented. This additional selection may for example be based on a criterion of precedence of selection of the coded audio stream. Thus, the most recently replicated stream is chosen. Of course, other criteria are possible; for example, according to the energies of the low sub-band signals obtained in step E502.

The selection of the high sub-band of the coded stream k' comprising HD content is thus performed in step E507 and constitutes the output audio stream $Bs_i^h = Be_{k'}^h$. This high sub-band bitstream ($Bs_i^h$) is replicated in step E508 so as to be transmitted to a terminal Ti with i≠k' at the same time as the low sub-band coded mixed stream ($Bs_i^l$).

In the case where several replication streams have been selected in step E507, these streams are replicated and combined with the low sub-band mixed stream.

In another variant embodiment, a step of classifying the input pathways is performed at E505, before the step of detecting the frequency band. The classification may for example be made from the most recently replicated pathway to the least recently replicated pathway or as a function of the energies of the low sub-band signals obtained in step E502. This step E505 can very obviously use another criterion for ranking the input pathways. For example, the order according to the replication sequencing can be weighted by the criterion used in step 501 or else according to the energies of the decoded signals of the low sub-band.

The analysis done in step E506 is then carried out on the streams of the input pathways ranked in the order determined in the classification step E505. As soon as an HD stream has been detected, the analysis stops.

Step E505 is optional and can be performed either on the N input pathways, or on the N' input pathways after application of the preselection step E501.

In the case where the preselection step E501 is performed and in the case where none of the preselected streams contains HD content detected in step E506, then the detection is done on the input streams not yet analyzed to find the existence of at least one stream which comprises the predetermined frequency band. If one exists, it is then the latter which is selected in step E507.

Advantageously, a pooling of the steps can be implemented. For example, the detection step such as described subsequently with reference to FIG. 9 uses a voice activity detection parameter which can also be used for the preselection step E501. It will then be understood that steps E501 and E506 may be combined and that part at least of their calculations and parameters can be pooled. Likewise when step E506 provides information about the reliability of the detection, this information is advantageously used by step E505 of classifying the input pathways.

In a particular embodiment, the terminal whose stream is replicated (here k'), does not receive any high sub-band streams since the high sub-band stream selected in step E507 is that originating from this terminal. For this terminal, in a variant embodiment, a step of selecting a second HD stream to be replicated k" can be performed for this output. We then have: $Bs_{k'}^h = Be_{k''}^h$, k"≠k'.

The embodiment described with reference to FIG. 5b describes the implementation of the invention in a terminal with multi-party communication, with meshed architecture or with centralized architecture using a replicating bridge.

In this embodiment, steps E501, E502, E503, E505, E506, E507 and E508 are the same as those described with reference to FIG. 5a.

Here, it is a terminal i which receives N input pathways (N hierarchical bitstreams coded by G.722 at 64 kbit/s).

As previously, we use the notation N' (with N'≤N) whether or not the optional step E501 is implemented and we denote by V' the set of indices of these input pathways.

Figure 9:
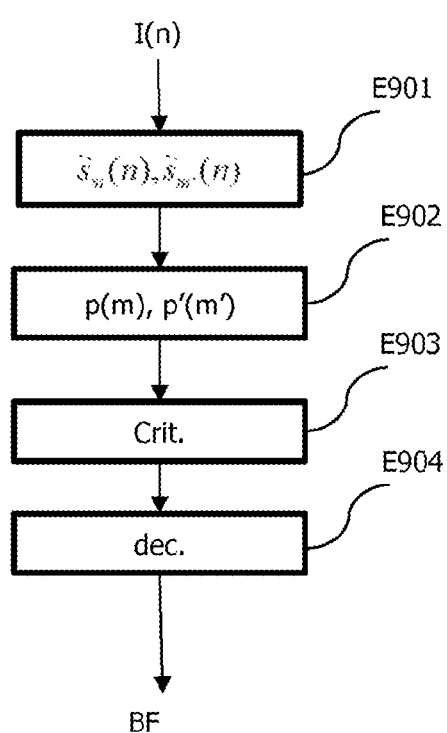
FIG. 9 illustrates the steps implemented in an embodiment for the step of detecting a predetermined frequency band according to the invention.

In this embodiment, the method uses in step E506 the technique described subsequently with reference to FIG. 9, to perform the detection of an HD content on an input pathway j. There is therefore no reconstruction of the signal in the high sub-band. In a particular embodiment, the parameters determined on the basis of the estimation of the signal according to this detection technique are also used in certain steps of the method of this embodiment, and especially the step of decoding the selected stream and also the streams in the low sub-bands. Indeed, these parameters then no longer have to be decoded, thus decreasing the complexity of the decoding steps.

Thus, an analysis of the audio content of a subset of N' input bitstreams to detect an HD content is performed in step E506, in the case where the preselection step E501 is implemented. A pathway k' is selected at E507 from among the pathways and the bitstream of the high sub-band $Be_{k'}^h$ of this pathway is replicated, in step E508, as bitstream for the high sub-band $Bs_i^h$ for terminal i. $Bs_i^h = Be_{k'}^h$.

Moreover, in step E502, the N' low sub-band signals $s_j^l$ are obtained by decoding of the low sub-band bitstreams $Be_j^l$, j∈V'.

In this embodiment, in step E503, the low sub-band signal $S_i^l$ is obtained by addition of the N' reconstructed signals of the low sub-band: $S_i^l = \Sigma s_j^l$; j∈V'. In contradistinction to FIG. 5a, $S_i^l$ here is always the sum of N' signals; indeed, the terminal does not receive its own stream.

In step E511, the high sub-band signal $S_i^h$ is obtained by decoding by the high sub-band G.722 decoder of the high sub-band bitstream $Bs_i^h$ obtained in step E508 by replication of the stream $Be_{k'}^h$ selected in step E507.

Finally, the wide-band reconstructed signal is obtained in E510 by G.722 synthesis QMF filtering of the two signals, low sub-band $S_i^l$ and high sub-band $S_i^h$.

In these two embodiments, the preselection step E501 makes it possible to reduce the number of streams to be taken into account for the analysis to be performed at E506 but also for the decoding of the low sub-band bitstreams of step E502 and for the mixing of step E503. This makes it possible therefore to globally reduce the complexity of the combining method. As in the previous case, the preselection can be performed as a variant or supplement after the decoding step.

Thus, in this embodiment, a bitstream of the high sub-band of a single input pathway is selected so as to be decoded by the high sub-band decoder of the G.722 (AD-PCM decoder at 2 bits per sample), the bitstreams of the two enhancement layers of the low sub-band of the input pathways are decoded with the stream of the core layer to obtain the decoded signals of the low sub-band which are added together.

A possible technique for detecting a predetermined frequency band in an audio stream coded according to the G.722 coding is now described with reference to FIG. 9. A step E901 determines initially, per frequency sub-band of a predetermined set of frequency sub-bands, a signal estimated on the basis of the bitstream. Accordingly, steps of obtaining an adaptation parameter associated with the quantization index for a current sample n and of calculating a signal estimated for the current sample on the basis of this determined adaptation parameter, of the signal estimated for the previous sample and of a predefined forgetting factor, are implemented. An exemplary embodiment of such a technique for determining an estimated signal is described in French patent application FR 11 52596.

This estimated signal is representative of the audio content which has been coded. The predetermined set of sub-bands, that is to say the sub-bands considered when estimating these representative signals as well as their number M, may be predefined or may evolve in the course of time.

Subsequently, this signal estimated for a sub-band m (0≤m<M) will be denoted:

$\tilde{s}_m(n)$, n=0, ..., $N_m$–1, $N_m$ being the number of samples in a sub-band m.

A step E902 of determining non-coded parameters representative of the audio content is thereafter implemented. These parameters p(m) are determined per frequency sub-band of the predetermined set of sub-bands, on the basis of the signal estimated in the corresponding sub-bands.

Several types of parameters can be calculated. A few examples thereof are given hereinafter.

For a sub-band m, a parameter can be determined for example on the basis of a norm of the estimated signal (or a power of this norm). Such parameters are given hereinbelow for a given band m (0≤m<M):

$$L_\infty(m) = \max_{n=0,\ldots,N_m-1}(|\tilde{s}_m(n)|);$$

$$L_1(m) = \sum_{n=0}^{N_m-1} |\tilde{s}_m(n)|; \quad L_2(m) = \sum_{n=0}^{N_m-1} \tilde{s}_m(n)^2$$

"Normalized" versions can also be used, such as:

$$L'_1(m) = \frac{1}{N_m}\sum_{n=0}^{N_m-1} |\tilde{s}_m(n)|; \quad L'_2(m) = \frac{1}{N_m}\sum_{n=0}^{N_m-1} \tilde{s}_m(n)^2$$

It is also possible to use other types of parameters such as a ratio: for example, the ratio between the minimum and the maximum of the estimated signal—in absolute values or otherwise—:

$$\rho_{min\ max}(m) = \frac{\min_{n=0,\ldots,N_m-1}(|\tilde{s}_m(n)|)}{\max_{n=0,\ldots,N_m-1}(|\tilde{s}_m(n)|)};$$

$$\rho'_{min\ max}(m) = \frac{\min_{n=0,\ldots,N_m-1}(\tilde{s}_m(n))}{\max_{n=0,\ldots,N_m-1}(\tilde{s}_m(n))}.$$

Obviously, the inverse of this ratio can also be considered.

In an exemplary embodiment, one and the same parameter is calculated for various sub-bands. However, a parameter can be calculated only on a more restricted number (optionally restricted to a single sub-band) of sub-bands.

On the basis of at least one of these parameters, step E903 is implemented to calculate at least one local criterion.

This local criterion can be calculated on the basis of parameters of a single sub-band or of parameters calculated on more than one sub-band. To distinguish these two categories of criterion we name them according to the number of sub-bands taken into account during the calculation, mono-band criterion and multi-band criterion.

For each category, a few examples of criteria are detailed hereinafter.

A mono-band criterion uses a "distance" between a parameter p(m) of a sub-band m and a threshold $\text{thresh}_{mo}(m)$. This threshold may or may not be adaptive and may optionally depend on the sub-band considered. We then denote by d(m) the mono-band criterion such that:

$$d(m)=\text{dist}(p(m),\text{thresh}_{mo}(m))$$

Advantageously, this "distance" is the simple difference between the parameter p(m) and this threshold:

$$d(m)=\text{dist}(p(m),\text{thresh}_{mo}(m))=p(m)-\text{thresh}_{mo}(m)$$

For example, these mono-band criteria can be defined by the equations hereinbelow, on the sub-bands m and m', (0≤m, m'<M):

$$\text{crit0}_{mo}(m)=\text{dist}(L_\infty(m),\text{thresh0}_{mo}(m)), \text{crit1}_{mo}(m')=\text{dist}(L'_1(m'),\text{thresh1}_{mo}(m')),$$

where $\text{thresh0}_{mo}(m)$ and $\text{thresh1}_{mo}(m')$ are thresholds—adaptive or non-adaptive—that can depend on the sub-band considered.

It would be possible, for example, to adapt the threshold on the band m as a function of the band m', or as a function of a previous block of samples.

A multi-band criterion compares parameters calculated on at least two sub-bands—for example, a parameter p(m) of a sub-band m and a parameter p'(m') of a sub-band m'.

Here again, as in the case of a mono-band criterion, a threshold $\text{thresh}_M(m,m')$—adaptive or non-adaptive—optionally dependent on the sub-bands considered, can be used.

For example, these multi-band criteria can be defined by the equations hereinbelow, on the sub-bands m and m', (0≤m, m'<M):

$$\text{crit0}_M(m,m')=\text{dist}_{th}(\text{dist}_p(\rho'_{min\ max}(m),\rho_{min\ max}(m')),\text{thresh0}_M(m,m')),$$

$$\text{crit1}_M(m,m')=\text{dist'}_{th}(\text{dist'}_p(L'_1(m),L'_1(m')),\text{thresh1}_M(m,m'))$$

Advantageously, a "distance" $\text{dist}_{th}$ is a simple difference between a threshold and a distance $\text{dist}_p$ between parameters of at least two sub-bands.

The distance $\text{dist}_p$ between parameters of at least two sub-bands can use ratios between parameters. For example, in the case of a "distance" between parameters of two sub-bands:

$$\text{dist}_p(L'_1(m), L'_1(m')) = L'_1(m)/L'_1(m') \text{ or}$$

$$\text{dist'}_p(L'_1(m), L_\infty(m')) = L'_1(m)/L_\infty(m')$$

It is also noted that one and the same set of parameters can be used to calculate several criteria both in the case of a mono-band criterion and of a multi-band criterion.

On the basis of at least one local criterion such as defined, step E904 is implemented. In this step, a local decision ("instantaneous", denoted $dec_{inst}^{cur}$) is taken by detecting whether the coded audio content comprises frequencies in at least one sub-band.

In a particular embodiment, in the case of detection of a frequency band termed the high-frequency band (i.e. frequencies above a threshold frequency $F_{th}$), it is decided whether the audio content comprises frequencies in sub-bands m such that, $m_{th} \leq m$, where $m_{th}$ is the index of the sub-band including the frequency $F_{th}$. At least one of these sub-bands m is taken into consideration in the decision step.

In the particular example of the G.722 fixed HD voice coder with two sub-bands, when it is sought to detect whether the coded content is actually wide-band (WB), it is detected whether there is any relevant content in the second sub-band (high sub-band) so as to take a "Narrow band" NB or "Widened band" WB decision.

In the case where the predetermined frequency band is not the high-frequency band, the decision is of course adapted and the sub-bands considered may be those which are below a threshold frequency to detect a low-frequency band or else those which are defined by frequencies bracketing this predetermined frequency band.

To take this decision, at least one local criterion is useful. As a variant, several criteria may be used alone or jointly.

The decision may be soft or hard. A hard decision consists in comparing at least one criterion with a threshold and in taking a binary decision or one with predefined states about the presence of the frequency band in the sub-band.

A soft decision consists in using the value of the criterion to define, according to an interval of predefined values, a higher or lower probability of presence of the frequency band in the sub-band considered.

In a particular embodiment, a step of detecting the type of content, for example a voice content, is firstly carried out so as to perform the local detection only on the relevant frames, that is to say those comprising this type of content.

To detect this type of content, in an advantageous manner, the parameters determined at E902 on the signals representative of the sub-band signals are used.

In a variant embodiment, to increase the reliability of detection, the final decision, denoted $dec^{cur}$, for a current block of samples depends not only on the "instantaneous" local detection but also on the past detections. On the basis of soft or hard local decisions per block, a global decision is taken on a number of K blocks preceding the current block. This number of K blocks is adjustable as a function of a reliability of the decision/speed of the decision compromise.

For example, the local detections can be smoothed over several blocks by an optionally sliding window. The dependency of the current decision on the past detections can also be a function of the reliability of the local decision. For example, if the local decision is estimated to be safe, the dependency of the current decision in relation to the past decisions may be minimized or indeed even canceled.

Several embodiments are possible for the detection method such as described, both in the choice of the parameters, of the criteria, of the manner of optionally combining several criteria and in the use of soft or hard decisions, locally or globally. It is possible thereby to optimize the complexity/reliability of detection compromise as well as the reactivity of the detection.

Figure 6:
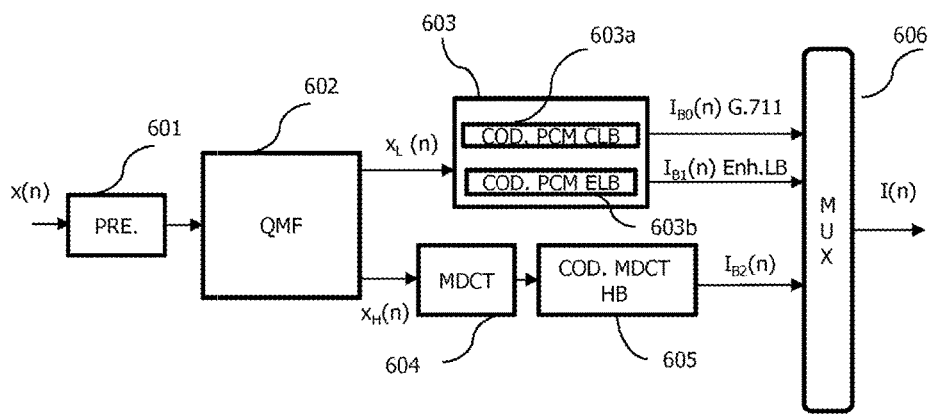
FIG. 6 illustrates a coder of G.711.1 type delivering streams able to be combined according to the method of the invention.

Another exemplary embodiment of the combining method according to the invention is now described. This embodiment describes the implementation of the invention in a partial mixing device comprising a bridge combining streams coded by the ITU-T G.711.1 coder at 96 kbit/s. This type of coder, illustrated in FIG. 6, is a sub-band coder, the low sub-band is coded hierarchically at 80 kbit/s (10 bits per sample) with a core coding at 64 kbit/s (8 bits per sample) and an enhancement layer at 16 kbit/s (i.e. 2 bits per sample on average) and the high sub-band at 16 kbit/s (2 bits per sample on average). It is also described in the above-mentioned document: "Rec. ITU-T G.711.1, Wideband embedded extension for G.711 pulse code modulation, 2008".

The G.711.1 coder operates on audio signals sampled at 16 kHz on blocks or frames of 5 ms (i.e. 80 samples at 16 kHz). The input signal x(n), optionally after a preprocessing by the module 601, is divided into 2 sub-bands [0, 4 kHz] and [4, 8 kHz] by QMF filters represented at 602. On the basis of two input samples the QMF filter gives as output a low sub-band (0-4000 Hz) sample $x_L(n)$ and a high sub-band (4000-8000 Hz) sample $x_H(n)$. The bitrate of 64 kbit/s ("Layer 0" compatible with G.711) corresponds to the quantization of the [0, 4 kHz] sub-band by the PCM (Pulse Code Modulation) technique equivalent to G.711, with shaping of the quantization noise. The following two layers ("Layers" 1 and 2) code respectively the low sub-band [0, 4 kHz] by a PCM coding enhancement technique, and the high sub-band [4, 8 kHz] by an MDCT ("Modified Discrete Cosine Transform") transform coding, each with a bitrate of 16 kbit/s (80 bits per frame). When the decoder receives these enhancement layers, it can enhance the quality of the decoded signal.

The core coding of the low sub-band signal is performed by the module 603*a*, included in the low sub-band coding module 603, according to the PCM technique equivalent to G.711, with shaping of the quantization noise. We briefly recall hereinafter the PCM coding used in G.711.

The G.711 coder is based on a logarithmic compression on 8 bits at the sampling frequency of 8 kHz, to give a bitrate of 64 kbit/s. The G.711 PCM coding operates a compression of the filtered signals in the [300-3400 Hz] band by a logarithmic curve which makes it possible to obtain a nearly constant signal-to-noise ratio for a wide dynamic range of signals. The quantization interval varies with the amplitude of the sample to be coded: when the level of the input signal is low, the quantization interval is small, when the level of the input signal is high, the quantization interval is large. Two logarithmic PCM compression laws are used: the μ-law (used in North America and in Japan) and the A-law (used in Europe and in the rest of the world). The G.711 A-law and the G.711 μ-law encode the input samples on 8 bits. In practice, to facilitate setup of the G.711 coder, the logarithmic PCM compression has been approximated by a curve in segments. During this compression, the low-order bits of the mantissa are lost.

In the A-law, the 8 bits are distributed in the following manner:

1 sign bit 3 bits to indicate the segment, 4 bits to indicate the placement in the segment.

The coding (performed by the module 603*b* of FIG. 6) of the enhancement layer ("Layer" 1) of the low sub-band makes it possible to reduce the quantization error for the core layer ("Layer" 0) based on G.711 by adding extra bits to the samples coded in G.711 (Enh.LB). This technique which makes it possible to obtain an increase in the SNR (Signal-to-Noise Ratio) of 6 dB for each bit added per sample consists in saving and in transmitting in an enhancement bitstream the high-order bits from among the bits lost during the initial PCM coding.

The recovery and the transmission of bits not transmitted in the mantissa of the PCM core coding enhances the quality of the coding of the low sub-band. Indeed, in case of reception of this enhancement layer, the decoder can decode the mantissa with greater precision. In G.711.1, the number of additional bits for the mantissa depends on the amplitude of the samples: indeed, rather than allocating the same number of bits to enhance the precision of the mantissa coding of the samples, the 80 bits available in layer 1 of G.711.1 to enhance the precision of the mantissa coding of the 40 samples are allocated dynamically: more bits being allotted to the samples with a high exponent. Thus, while the bits budget of the enhancement layer is 2 bits per sample on average (16 kbit/s), with this adaptive allocation, the number of bits allocated to a sample varies according to its exponent value from 0 to 3 bits.

For the high sub-band, a Modified Discrete Cosine Transform (MDCT) is firstly performed by the module 604, on blocks of the signal of the high band of 10 ms with an overlap of 5 ms. Next the 40 MDCT coefficients, $S_{HB}(k)$, are coded by the module 605 by a vector quantization with interleaved conjugate structure and these coefficients are thereafter weighted and then normalized (by the square root of their energy). These coefficients are then distributed into 6 sub-vectors of dimension 6, the 4 coefficients representing the highest frequencies are not coded. These six sub-vectors are quantized independently on 12 bits by a set of two dictionaries with conjugate structure, $C_{H0w}$ and $C_{H1w}$. Finally a global gain per frame is calculated on the basis of the decoded sub-vectors and of the normalization factor, this gain being quantized on 8 bits by a scalar quantizer of μ-law PCM type.

At the decoder, the set of 36 MDCT coefficients is reconstructed on the basis of the six decoded sub-vectors with inverse interleaving, and the 4 coefficients representing the highest non-coded frequencies are simply set to zero and then the decoded signal of the high band is generated by inverse MDCT transform.

The various coding layers ($I_{B0}(n)$, $I_{B1}(n)$, $I_{B2}(n)$) are multiplexed at 606 to give the coded signal I(n).

In the embodiment described with reference to FIG. 7 which represents the steps of the method according to the invention, implemented in a partial mixing device with centralized architecture receiving streams coded by the ITU-T G.711.1 coder at 96 kbit/s, the bitstreams of the two enhancement layers of an input pathway are replicated, the mixing is limited to the core layer.

Thus, the bridge receives N input pathways (N hierarchical bitstreams coded by G.711.1 at 96 kbit/s). For each input pathway (0≤j<N) we denote by:

$Be_j^0$ the incoming bitstream of the low sub-band core layer;

$Be_j^1$ the incoming bitstream of the enhancement layer of the low sub-band;

$Be_j^2$ the high sub-band incoming bitstream;

$s_j^{0'}$ the core layer (low sub-band) reconstructed signal obtained by decoding the stream $Be_j^0$;

$s_j^l$ the low sub-band reconstructed signal obtained by decoding the streams $Be_j^0$ and $Be_j^1$;

$s_j^2$ the high sub-band reconstructed signal obtained by decoding the stream $Be_j^2$;

For each output pathway (0≤i<N) we also denote by:

$Bs_i^0$ the outgoing bitstream of the core layer of the low sub-band;

$Bs_i^1$ the outgoing bitstream of the enhancement layer of the low sub-band;

$Bs_i^2$ the outgoing bitstream of the enhancement layer of the high sub-band.

On the basis of these N sub-band-coded streams, an optional preselection step E701 is implemented.

Just as for the embodiments described with reference to FIGS. 5a and 5b, this preselection step makes it possible to select, from among the various input pathways, those which comply with one or more of the selection criteria described previously for the prior art schemes. For example, the selection of the streams can be performed on the basis of the voice activity detection by the FCFS ("First Come First Served") criterion or on the basis of the measurement of the power of the signal or of its energy by the LT ("Loudest Talker") criterion.

Thus, a part (N' with N'<N) of the coded streams received by the combining device or mixing bridge is taken into account to implement the combining method. This therefore reduces the complexity of implementation of the steps of the method since the number of pathways to be mixed is restricted.

As previously, we use the notation N' (with N'≤N) whether or not the optional step E701 is implemented, we denote by V' the set of indices of these input pathways. Likewise, the preselection can be performed as a variant or supplement after the decoding step.

Step E702 of decoding the N' streams of the core layer of the low sub-band, is thereafter implemented. Thus, the core layers of the low sub-bands $Be_j^0$ are decoded to obtain the reconstructed signals $s_j^{0'}$.

In step E703, a procedure for mixing the bitstreams thus decoded is performed by addition of signals thus reconstructed of the low sub-band (core layer): $S_i^0 = \Sigma s_j^{0'}$ with j∈V', j≠i. Note that if i∈V', $S_i^l$ is the sum of N'−1 signals, otherwise $S_i^l$ is the sum of N' signals.

The low sub-band core layer output bitstream ($Bs_i^0$) intended to be transmitted to a terminal Ti (0≤i<N) is then obtained by coding in step E704, by the core encoder of the low sub-band of G.711.1 (PCM on 8 bits with shaping of the coding noise) of this sum signal $S_i^0$.

On the basis of the set N' of input pathways, a step E705 of selecting at least one bitstream ($Be_k^1$) of the enhancement layer of the low sub-band (layer 1) of an input pathway k to be replicated is performed. The criterion (crit.1) used for this selection can be a criterion as mentioned in the prior art schemes, for example, the FCFS ("First Come First Served") criterion or else the LT ("Loudest Talker") criterion. The choice of the criterion can depend on that employed in the preselection step if the latter has been implemented. On the basis of this selection, at least one bitstream of the enhancement layer of the low sub-band ($Bs_i^1$) to be replicated in step E706 is obtained so as to transmit it to the terminal Ti: $Bs_i^1 = Be_k^1$ (i≠k).

On the basis again of the N' coded streams a step E708 of detecting a predetermined frequency band, in the high sub-band, is performed. In this embodiment, the predetermined frequency band is the high-frequency band. This makes it possible to determine the presence of an HD content in the coded stream. Thus, an analysis of the audio content of the input pathways is performed.

Various modes of detection of the presence of the high-frequency band are possible. For example, the scheme for detecting an HD content in a stream j can use a comparison of the energy of the reconstructed signal of the high sub-band, $s_j^2$, with that of the reconstructed signal of the low sub-band $s_j^l$. This embodiment requires a decoding of the audio stream to be analyzed in the high sub-band, in addition to the decoding of the core low sub-band 0 and of the enhancement low sub-band 1.

At least one bitstream ($Be_k^2$) of the high sub-band (layer 2) of an input pathway k' to be replicated for the enhancement layer of the high sub-band to be transmitted to the terminal Ti is selected at E709 after analysis of the content of the input pathways to detect whether there is any HD content. If the pathway k' contains the predetermined frequency band, we then have $Bs_i^2=Be_{k'}^2$ ($i \neq k'$).

Figure 7:
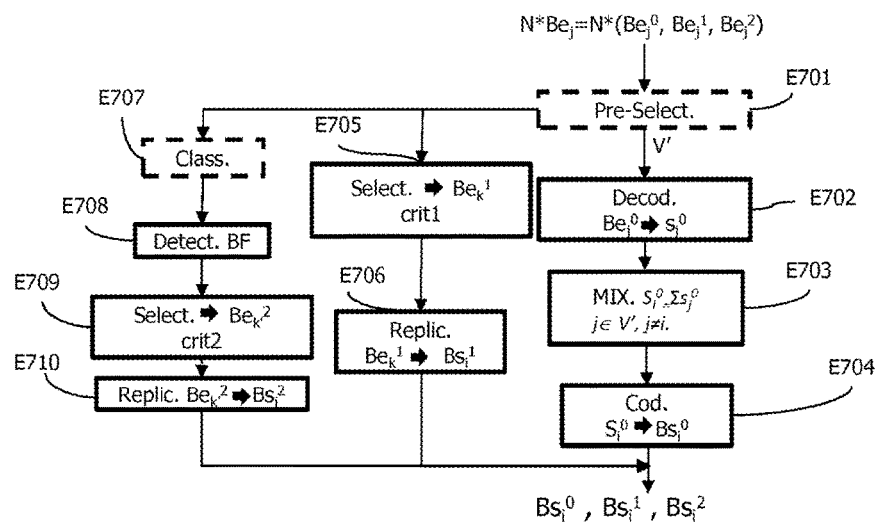
FIG. 7 illustrates the steps, implemented in a centralized bridge, of a particular embodiment for coded streams of G.711.1 type.

In the case where several coded streams comprise HD content, an additional selection, not represented in FIG. 7, can be implemented. This additional selection may for example be based on a criterion of precedence of selection of the coded audio stream. Thus, the most recently replicated stream is chosen, thereby affording continuity and a gentle transition for the switching of the replicated stream. Alternatively, if the pathway k selected in step E705 to replicate the enhancement layer of the low sub-band actually contains the predetermined frequency band (HD content), it is the bitstream $Be_k^2$ which can be selected to be replicated $Bs_i^2=Be_k^2$ ($i \neq k$).

The selection of the high sub-band of the coded stream k' comprising HD content is thus performed in step E709 and constitutes the output audio stream $Bs_i^2=Be_{k'}^2$. This high sub-band bitstream ($Bs_i^2$) is obtained by replication in step E710 so as to be transmitted to a terminal Ti with $i \neq k'$ at the same time as the two streams of the low sub-band, the stream $Bs_i^1$ obtained by replication and the stream $Bs_i^0$ obtained by coding of the mixed signal.

In the case where several replication streams have been selected in step E709 and/or in step E705, these streams are replicated and combined with the mixed stream of the core layer of the low sub-band.

In another variant embodiment, a step of classifying the input pathways is performed at E707, before the step of detecting the frequency band. The classification may for example be done from the most recently replicated pathway to the least recently replicated pathway.

The analysis done in step E708 is then effected on the streams of the input pathways ranked in the order from the pathway whose high sub-band bitstream has been most recently replicated to the pathway whose high sub-band bitstream has been least recently replicated. As soon as an HD stream has been detected, the analysis stops.

This step E707 can very obviously use another criterion for ranking the input pathways as in the case of the embodiment with the G.722 coder described with reference to FIGS. 5a and 5b.

Step E707 is optional and may or may not be implemented as a supplement to the preselection step E701.

In the case where the preselection step E701 is performed and in the case where none of the preselected streams contains HD content detected in step E708, then the detection is done on the input streams not yet analyzed to find the existence of at least one stream which comprises the predetermined frequency band. If one exists, it is then the latter which is selected in step E709.

Advantageously, a pooling of the steps can be implemented for the detection of HD content in the input pathways. Likewise, according to the detection scheme used, parameters which have been determined can be reused to decode the frequency sub-band of the selected coded audio stream. These parameters then no longer have to be decoded, thus making it possible to reduce the complexity of decoding this stream.

In a variant embodiment, the selection of at least one bitstream k to be replicated for layer 1 is not done according to the criteria as described previously. The bitstream of the low sub-band 1 to be replicated may, in this case, be that corresponding to the stream k' selected in step E709 for the high sub-band.

In this case, the bitstreams $Be_{k'}^1$ and $Be_{k'}^2$ are replicated.

In a particular embodiment, the terminal whose stream is replicated (here for example k'), does not receive any high sub-band streams nor any streams of enhancement layers since these selected streams originate from this terminal. For this terminal, in a variant embodiment, a step of selecting a second HD stream to be replicated k1 can be performed for the enhancement layers of this output: $Bs_{k'}^1=Be_{k1}^1$ and $Bs_{k'}^2=Be_{k1}^2$, $k1 \neq k'$.

Although the invention is described in the case of the partial mixing of streams coded by wide-band coders with a conventional mixing of at least the core layer of the narrow band, it will be understood that the invention applies also to the partial mixing of streams coded by coders operating on other bandwidths (medium band, super-wide-band, HiFi band, etc.) with a conventional mixing of at least one low sub-band and the replication of the streams coding the sub-bands above the mixed sub-bands. For example in the case of a coder of super-HD type (with four sub-bands coded by ADPCM technology), the application of the invention may for example consist in performing a direct recombination of the signals of the two low sub-bands (corresponding to the wide-band [0-8 kHz]) and switching the selected streams of two high sub-bands (corresponding to the audio band [8-16 kHz]), the selection of these streams being made according to the method of the invention. Another exemplary application of the invention to this super-HD coder consists in mixing the signals of the lowest sub-band (corresponding to the narrow band [0-4 kHz]) and switching the streams, selected according to the invention, of three high sub-bands (corresponding to the audio band [4-16 kHz]).

Likewise the decomposition into frequency sub-bands might not be performed by a filter bank. Thus in the case of the IETF coder described in RFC6716, the signal to be coded by the linear prediction coder is obtained by a resampling of the signal to be coded (for example to obtain a signal sampled at 16 kHz on the basis of a signal sampled at 48 kHz).

In this case the invention decodes the part of the bitstreams coding the wide-band, mixes the wide-band decoded signals and selects an input pathway for which the super-HD (frequency above the wide-band) coded part of the stream is replicated.

Figure 8A:
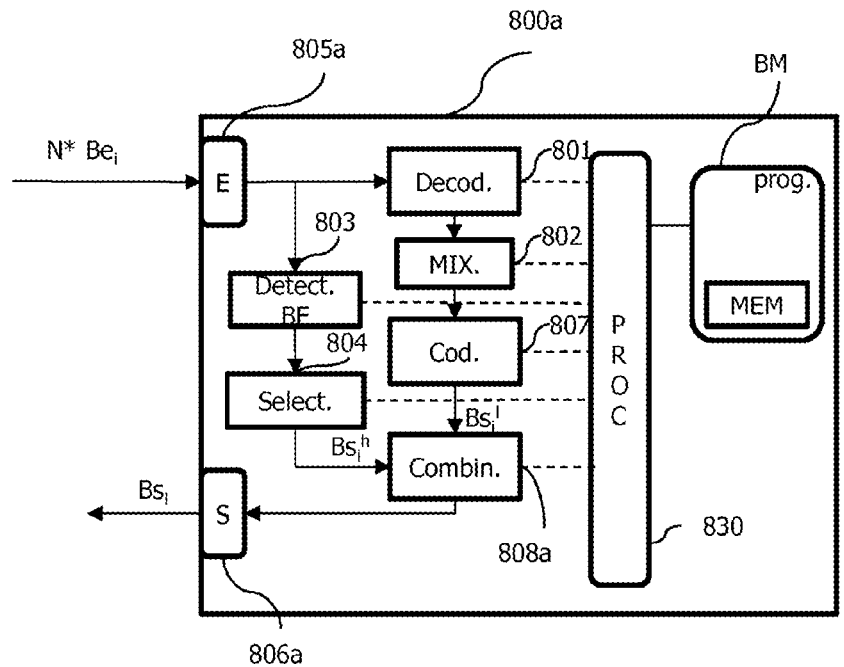
FIGS. 8a and 8b illustrate hardware representations of combining devices according to embodiments of the invention.
Figure 8B:
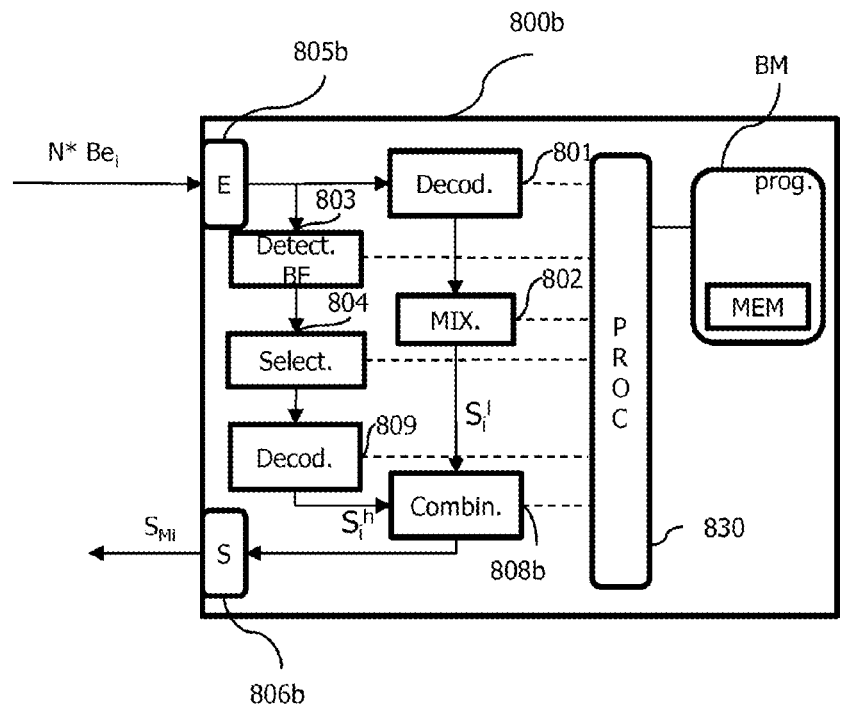

FIGS. 8a and 8b represent combining devices 800a and 800b in exemplary embodiments of the invention. These devices implement the combining method as described with reference to FIG. 3 by the main steps E301 to E304.

The device 800a of FIG. 8a may be more particularly associated with a centralized bridge such as a conference bridge in a communication system comprising a plurality of terminals.

For its part, the device 800b of FIG. 8b may be more particularly associated with a terminal or communication gateway.

Hardware-wise, these devices 800a and 800b comprise a processor 830 cooperating with a memory block BM comprising a storage and/or work memory MEM.

The processor drives processing modules able to implement the method according to the invention. Thus, these devices comprise a module 801 for decoding a part of the streams coded on at least one frequency sub-band, a module 802 for adding the streams thus decoded to form a mixed stream, a module 803 for detecting presence of a predetermined frequency band in a stream, a module 804 for selecting on the basis of the detection module, from among the plurality of coded audio streams, at least one replication coded stream, on at least one frequency sub-band different from that of the decoding step hereinabove.

The memory block can advantageously comprise a computer program (prog.) comprising code instructions for the implementation of the steps of the combining method within the meaning of the invention, when these instructions are executed by the processor PROC and especially the steps of decoding a part of the streams coded on at least one frequency sub-band, of adding the streams thus decoded to form a mixed stream, of selecting, from among the plurality of coded audio streams, at least one replication coded stream, on at least one frequency sub-band different from that of the decoding step, the selection of the at least one replication coded stream being performed according to a criterion taking into account the presence of a predetermined frequency band in the coded stream.

Typically, the description of FIG. 3 reuses the steps of an algorithm of such a computer program. The computer program can also be stored on a memory medium readable by a reader of the device or downloadable into the memory space of the latter.

The memory MEM records, in a general manner, all the data necessary for the implementation of the combining method.

The device 800a of FIG. 8a furthermore comprises a coding module 807 able to implement the coding step E305a of FIG. 3. This coding module codes the mixed stream obtained by the mixing module 802 before it is combined by the combining module 808a with the replication stream selected by the module 804. The module 808a is able to implement the combining step E306a of FIG. 3.

The streams $Bs_i$ resulting from the combining are transmitted to the various terminals of the communication system via an output module 806a. This device 800a also comprises an input module 805a able to receive a plurality of coded audio streams $N*Be_i$ originating for example from the various terminals of the communication system, these coded audio streams having been coded by a frequency sub-band coder.

The device 800b of FIG. 8b comprises a decoding module 809 able to implement the decoding step E305b of FIG. 3. This decoding module decodes the replication stream selected by the module 804 before it is combined by the combining module 808b with the mixed stream obtained by the mixing module 802. The module 808b is able to implement the combining step E306b of FIG. 3.

The stream $S_{Mi}$ resulting from the combining is transmitted to the restitution system of the device or terminal via an output module 806b. This device 800b also comprises an input module 805b able to receive a plurality of coded audio streams $N*Be_i$ originating for example from various communication channels, these coded audio streams having been coded by a frequency sub-band coder.

The invention claimed is:

1. A method for combining a plurality of audio signal streams coded according to a frequency sub-band coding, wherein the method comprises the following acts performed by a combining device:
   receiving a plurality of audio signal streams coded according to a frequency sub-band coding;
   decoding of a plurality of the received audio signal streams on at least one common frequency sub-band;
   adding the plurality of decoded audio signal streams to form a mixed signal stream in the at least one common frequency sub-band;
   selecting, from among the plurality of received coded audio signal streams, of at least one replication coded signal stream, on at least one frequency sub-band different from that of the decoding act, according to a criterion taking into account the presence of a predetermined frequency band in the coded signal stream;
   transmitting of the mixed signal stream and the at least one replication coded signal stream.

2. The method as claimed in claim 1, further comprising an act of preselecting the coded audio signal streams according to a predetermined criterion.

3. The method as claimed in claim 1, wherein, in the case where several coded signal streams are selected in the selecting act, an additional selecting of replication coded signal stream is performed on a criterion of precedence of selection of the signal streams.

4. The method as claimed in claim 1, further comprising an act of re-encoding the mixed signal stream and an act of combining with the replication signal stream obtained before transmitting.

5. The method as claimed in claim 1, wherein the decoding act is performed on low-frequency sub-bands and the predetermined frequency band of the selecting criterion is a frequency band above said low-frequency sub-bands.

6. The method as claimed in claim 1, further comprising a prior act of classifying the coded audio signal streams and in that the replication coded signal stream selected is the first signal stream in this order of classification in which the predetermined frequency band has been detected.

7. The method as claimed in claim 1, wherein the presence of a predetermined frequency band in a coded signal stream is effected by a comparison of energy, in the various frequency sub-bands, of the decoded audio signal streams.

8. The method as claimed in claim 1, wherein the presence of a predetermined frequency band in a coded signal stream is effected according to the following acts:
   determining by frequency sub-band of a predetermined set of sub-bands, of a signal estimated on the basis of the coded signal stream;
   determining by frequency sub-band of the predetermined set of sub-bands, of non-coded parameters representative of the audio content, on the basis of the corresponding estimated signal;
   calculating of at least one local criterion on the basis of the parameters determined;
   deciding as regards the presence of a predetermined frequency band in at least one sub-band of the audio content as a function of the at least one local criterion calculated.

9. A device for combining a plurality of audio signal streams coded according to a frequency sub-band coding, wherein the device comprises:
   an input module receiving a plurality of audio signal streams coded according to a frequency sub-band coding;
   a module for decoding a plurality of the received audio signal streams on at least one common frequency sub-band;
   a module for adding the plurality of decoded audio signal streams to form a mixed signal stream in the at least one common frequency sub-band;
   a module for selecting, from among the plurality of received coded audio signal streams, at least one replication coded signal stream, on at least one frequency sub-band different from that of the decoding act, according to a criterion taking into account the presence of a predetermined frequency band in the coded signal stream;

an output module transmitting the mixed signal stream and the at least one replication coded signal stream.

10. A conference bridge comprising a device for combining a plurality of audio signal streams coded according to a frequency sub-band coding, wherein the device comprises:

an input module receiving a plurality of audio signal streams coded according to a frequency sub-band coding;

a module for decoding a plurality of the received audio signal streams on at least one common frequency sub-band;

a module for adding the plurality of decoded audio signal streams to form a mixed signal stream in the at least one common frequency sub-band;

a module for selecting, from among the plurality of received audio signal streams, at least one replication coded signal stream, on at least one frequency sub-band different from that of the decoding act, according to a criterion taking into account the presence of a predetermined frequency band in the coded signal stream;

an output module transmitting the mixed signal stream and the at least one replication coded signal stream.

11. A communication device comprising a device for combining a plurality of audio signal streams coded according to a frequency sub-band coding, wherein the device comprises:

an input module receiving a plurality of audio signal streams coded according to a frequency sub-band coding;

a module for decoding a plurality of the received audio signal streams coded on at least one common frequency sub-band;

a module for adding the plurality of decoded audio signal streams thus decoded to form a mixed signal stream in the at least one common frequency sub-band;

a module for selecting, from among the plurality of received audio signal streams, at least one replication coded signal stream, on at least one frequency sub-band different from that of the decoding act, according to a criterion taking into account the presence of a predetermined frequency band in the coded signal stream;

an output module transmitting the mixed signal stream and the at least one replication coded signal stream.

12. The communication device as claimed in claim 11, wherein the communication device is a communication gateway.

13. A non-transitory computer-readable medium, on which is stored a computer program comprising code instructions for execution of steps of a method for combining a plurality of audio signal streams coded according to a frequency sub-band coding, when these instructions are executed by a processor, wherein the method comprises the following steps performed by the processor as configured by the instructions:

receiving a plurality of audio signal streams coded according to a frequency sub-band coding;

decoding of a plurality of the received audio signal streams coded on at least one common frequency sub-band;

adding of the plurality of decoded audio signal streams thus decoded to form a mixed signal stream in the at least one common frequency sub-band;

selecting, from among the plurality of coded audio signal streams, of at least one replication coded signal stream, on at least one frequency sub-band different from that of the decoding act, according to a criterion taking into account the presence of a predetermined frequency band in the coded signal stream;

transmitting of the mixed signal stream and the at least one replication coded signal stream.

14. The communication device as claimed in claim 11, wherein the communication device is a communication terminal.

15. The method as claimed in claim 1, further comprising an act of performing a first preselection of the coded audio signal streams according to a predetermined criterion and a second preselection to restrict a number of pathways taken into account for selecting.

* * * * *